United States Patent
Oggier et al.

(10) Patent No.: US 8,223,215 B2
(45) Date of Patent: Jul. 17, 2012

(54) ADAPTIVE NEIGHBORHOOD FILTERING (ANF) SYSTEM AND METHOD FOR 3D TIME OF FLIGHT CAMERAS

(75) Inventors: Thierry Oggier, Zurich (CH); Bernhard Buettgen, Adliswil (CH); Thierry Zamofing, Wettingen (CH)

(73) Assignee: MESA Imaging AG, Zurich (CH)

( * ) Notice: Subject to any disclaimer, the term of this patent is extended or adjusted under 35 U.S.C. 154(b) by 632 days.

(21) Appl. No.: 12/363,169

(22) Filed: Jan. 30, 2009

(65) Prior Publication Data

US 2009/0190007 A1 Jul. 30, 2009

Related U.S. Application Data

(60) Provisional application No. 61/024,614, filed on Jan. 30, 2008.

(51) Int. Cl.
*H04N 5/228* (2006.01)
(52) U.S. Cl. .................................... 348/222.1
(58) Field of Classification Search ............. 348/207.99, 348/22.1, 222.1; 250/208.1, 214 R; 382/106, 382/154, 264
See application file for complete search history.

(56) References Cited

U.S. PATENT DOCUMENTS

| | | | |
|---|---|---|---|
| 5,856,667 A | 1/1999 | Spirig et al. | |
| 5,966,678 A | 10/1999 | Lam | |
| 6,777,659 B1 | 8/2004 | Schwarte | |
| 6,825,455 B1 | 11/2004 | Schwarte | |
| 2006/0108611 A1 | 5/2006 | Seitz | |

FOREIGN PATENT DOCUMENTS

| | | |
|---|---|---|
| DE | 4440613 C1 | 7/1996 |
| DE | 19821974 A1 | 11/1999 |
| GB | 2389960 A | 12/2003 |
| WO | 2007/045108 A1 | 4/2007 |

OTHER PUBLICATIONS

International Preliminary Report on Patentability dated Aug. 3, 2010, from counterpart International Application No. PCT/US2009/032623, filed on Jan. 30, 2009.

Medeiros, Fatima N.S., et al, "Speckle Noise MAP Filtering Based on Local Adaptive Neighborhood Statistics," Computer Graphics and Image Processing, 1999. Proceedings, XII Brazili an Symposium on Campinas, Brazil Oct. 17-20, 1999, Los Alamitos, CA, USA, IEEE Comput. Soc. US, Oct. 17, 1999, pp. 347-354.

Oprisescu, Serban, et al., "Measurements with ToF Cameras and Their Necessary Corrections," Signals, Circuits and Systems, 2007, ISSCS 2007, International Symposium on, IEEE, PI, Jul. 1, 2007, pp. 1-4.

Rangayyan, Rangaraj M., et al, "Adaptive-neighborhood filtering of images corrupted by signal-dependent noise," Applied Optics, vol. 37, No. 20, pp. 4477-4487, Jul. 10, 1998.

International Search Report and Written Opinion of the International Searching Authority dated May 18, 2009, from counterpart International Application No. PCT/US2009/032623, filed on Jan. 30, 2009.

*Primary Examiner* — Alicia M Harrington
(74) *Attorney, Agent, or Firm* — Houston Eliseeva, LLP

(57) ABSTRACT

A method for filtering distance information from a 3D-measurement camera system comprises comparing amplitude and/or distance information for pixels to adjacent pixels and averaging distance information for the pixels with the adjacent pixels when amplitude and/or distance information for the pixels is within a range of the amplitudes and/or distances for the adjacent pixels. In addition to that the range of distances may or may not be defined as a function depending on the amplitudes.

10 Claims, 5 Drawing Sheets

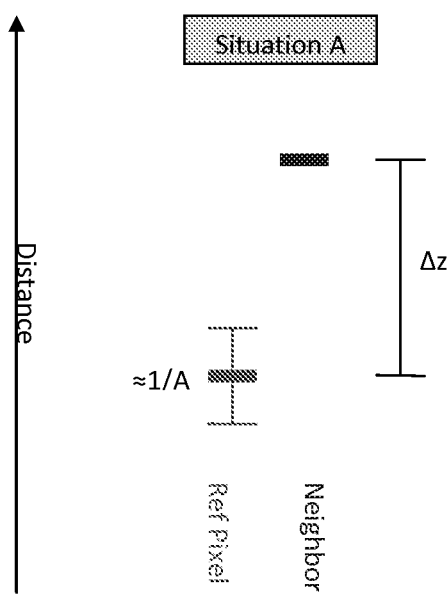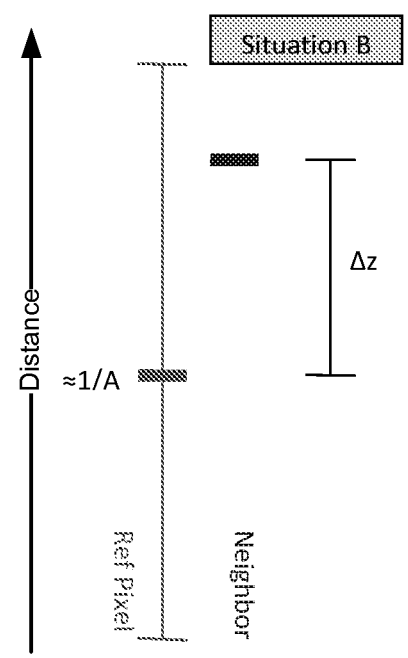
Fig. 5A
Fig. 5B

ADAPTIVE NEIGHBORHOOD FILTERING (ANF) SYSTEM AND METHOD FOR 3D TIME OF FLIGHT CAMERAS

RELATED APPLICATIONS

This application claims the benefit under 35 USC 119(e) of U.S. Provisional Application No. 61/024,614, filed on Jan. 30, 2008, which is incorporated herein by reference in its entirety.

BACKGROUND OF THE INVENTION

Time of flight (TOF) sensors typically utilize charge-coupled device (CCD) or complementary metal oxide semiconductor (CMOS) based technologies that are able to sample at high speed. The typical application is for point distance sensing or three-dimensional (3D) imaging in which the scene of interest is actively illuminated with modulated illuminating radiation and the sensor sampling is performed synchronously with the modulation of the illuminating radiation. These high speed sensors are also useful in other applications such as fluorescence lifetime imaging.

Generally, in these sensors, light is converted to electrical charge carriers in the form of electron-hole pairs in a photosensitive region. Usually electrons, but also holes, are exploited as information carrier. Switches are then opened and closed accordingly to transfer the charge carriers to one or more integration gates where the charge is stored until readout is performed. In the typical example, specific integration gates are assigned to different phases within the period of the stimulation or illuminating radiation such that the switches are controlled synchronously with the stimulation radiation in order to move the charge carriers from the photosensitive region to the integration gates for the phase assigned to that gate.

An early example of a TOF sensor was disclosed in the German patent DE4440613C1 (Spirig, "Vorrichtung und Verfahren zur Detektion eines intensitätsmodulierten Strahlungsfeldes", 1996). See also U.S. Pat. No. 5,856,667. A demodulation device is presented that samples the impinging optical sinusoidally-modulated illumination radiation n times. Charge coupled devices are used for the detection of the illumination radiation and the subsequent transport of the photo-generated charges.

Later, German patent application DE19821974A1 (Schwarte, Vorrichtung und Verfahren zur Erfassung von Phase und Amplitude elektromagnetischer Wellen, 1999), see also U.S. Pat. No. 6,825,455 B1, disclosed a photon-mixing element for a TOF sensor in which the switches that are used to transfer the charge carriers to the integration gates are controlled based on the modulation used for the illumination signal. In order to get a pixel with high-sensitivity and high-speed demodulation facility, a combined structure of stripe-like elements, each of them with short transport paths, is proposed. Nevertheless, the stripe-like structure leads to a poor fill-factor because the regions between the stripes are not photo-sensitive.

Another approach for large-area demodulation pixel for a TOF sensor with high sensitivity and high demodulation speed is given in the English patent application GB2389960A (Seitz, "Four-tap demodulation pixel", 2003). See also US. Pat. Publ. No. US 2006/0108611 A1. A high-resistive photo-gate of rectangular shape and large size generates a drift-field within the semiconductor substrate enforcing the photo-generated charges to drift to the particular sampling node. Here, any delay of the sampling signal arising on the photo-gate due to large resistance-capacitance (RC) times can reduce the performance of such demodulation pixels. In particular, high frequencies are difficult to realize when many pixels are controlled at the same time. Then the external electronics and their limited driving capability of large capacitances represent the constraining factor.

WO 2007/045108 A1 presents a newer TOF sensor example. Here, the drift field over most or all of the photosensitive area is basically static in time. The static or quasi static field in the photosensitive region moves or dumps the charge carriers into a typically smaller modulated region, which may or may not be photosensitive. The charge carriers are then swept from the modulated region into integration regions or gates synchronously with the modulated signal. This newer system can operate at much higher frequencies because demodulation is over a much smaller area, having a lower intrinsic capacitance, whereas transport within the large photosensitive region can be optimized for speed. The newer demodulation device avoids the trade-off between the sensitivity/fill-factor and the demodulation speed. Both aspects can be optimized in the pixel at the same time using this technology.

SUMMARY OF THE INVENTION

In general according to one aspect, the invention features a method for filtering distance information from a 3D-measurement camera system. The method comprises comparing amplitude and/or distance information for pixels to adjacent pixels and averaging distance information for the pixels with the adjacent pixels when amplitude and/or distance information for the pixels is within a range of the amplitudes and/or distances for the adjacent pixels.

In embodiments, the step of comparing comprises comparing the amplitude for pixels to adjacent pixels; and the step of averaging distance information for pixels comprises averaging the distance of pixels with the distance of adjacent pixels when the amplitude information for the pixels is within a range of the amplitudes for the adjacent pixels.

In other embodiments, the step of comparing comprises comparing the distance for pixels to adjacent pixels; and the step of averaging distance information for pixels comprises averaging the distance of pixels with the distance of adjacent pixels when the distance information for the pixels is within a range of the distances for the adjacent pixels, where the range is determined by the amplitudes.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIGS. 5A and 5B illustrate plausibility checking for the adaptive neighborhood filtering according to an implementation of the present invention;

DETAILED DESCRIPTION OF THE PREFERRED EMBODIMENTS

Figure 1:
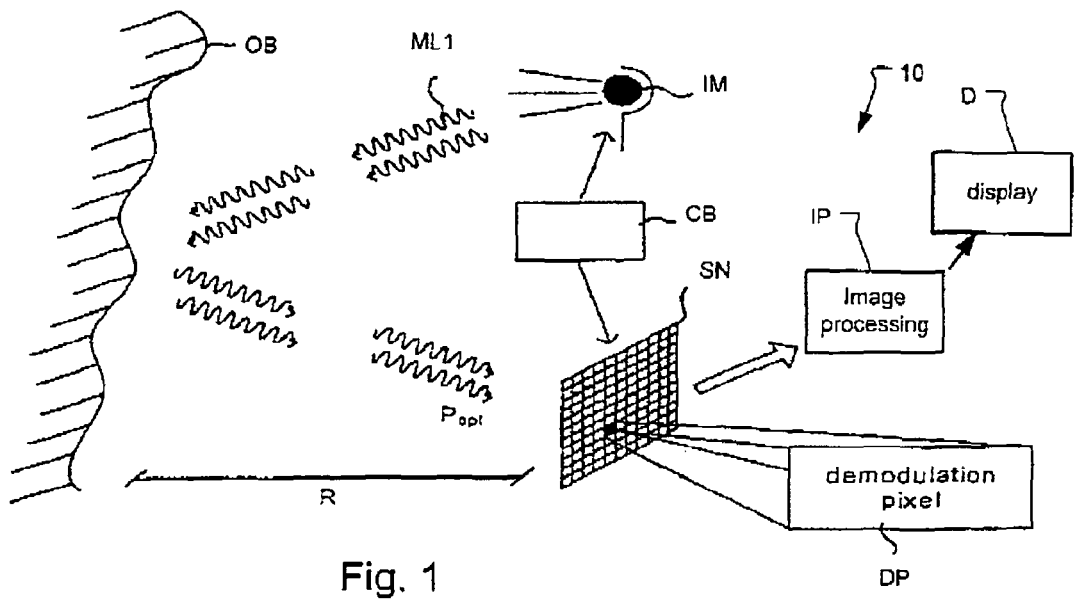
FIG. 1 shows a conventional scheme of the three-dimensional-measurement set-up using a sensor comprising demodulation pixels.

FIG. 1 illustrates the basic principle of a 3D-measurement camera system.

Modulated illumination light ML1 from an illumination module or light source IM is sent to the object OB of a scene. A fraction of the total optical power sent out is reflected to the camera 10 and detected by the 3D imaging sensor SN. The sensor SN comprises a two dimensional pixel matrix of demodulation pixels DP. Each pixel DP is capable of demodulating the impinging light signal. A control board CB regulates the timing of the camera 10. The phase values of all pixels correspond to the particular distance information of the corresponding point in the scene. The two-dimension gray scale image with the distance information is converted into a three-dimensional image by image processor IP. This can be displayed to a user via display D or used as a machine vision input.

The distance R for each pixel is calculated by $$R=(c*TOF)/2,$$

with c as light velocity and TOF corresponding to the time-of-flight. Either pulse intensity-modulated or continuously intensity-modulated light is sent out by the illumination module or light source IM, reflected by the object and detected by the sensor. With each pixel of the sensor being capable of demodulating the optical signal at the same time, the sensor is able to deliver 3D images in real-time, i.e., frame rates of up to 30 Hertz (Hz), or even more, are possible. In pulse operation the demodulation would deliver the time-of-flight directly. However, continuous sine modulation delivers the phase delay (P) between the emitted signal and the received signal, also corresponding directly to the distance R:

$$R=(P*c)/(4*pi*fmod),$$

where fmod is the modulation frequency of the optical signal.

Figure 2A:
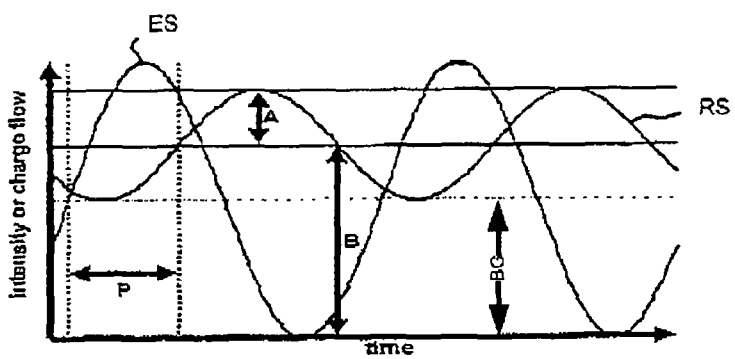
FIGS. 2A and 2B are plots representing the optical intensity and the charge flow as a function of the time for the emitted signal and the received signal, respectively, using the scheme of FIG. 1.
Figure 2B:
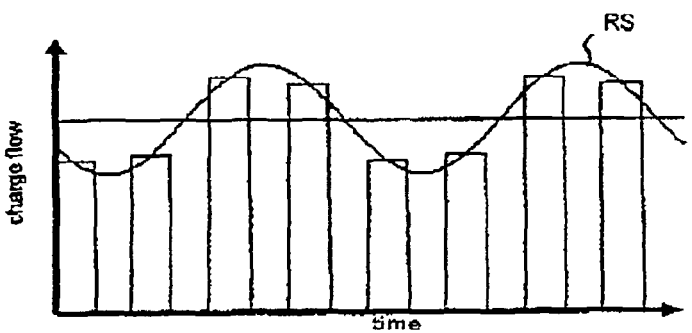

FIGS. 2A and 2B show the relationship between signals for the case of continuous sinusoidal modulation and the signal sampling. Although this specific modulation scheme is highlighted in the following, the utilization of the pixel in 3D-imaging is not restricted to this particular scheme. Any other modulation scheme is applicable: e.g. pulse, rectangular, pseudo-noise or chirp modulation. Only the final extraction of the distance information is different.

FIG. 2A shows both the modulated emitted illumination signal ES and received signal RS. The amplitude A, offset B of the received signal RS and phase P between both signals are unknown, but they can be unambiguously reconstructed with at least three samples of the received signal. BG represents the received signal part due to background light.

As shown in FIG. 2B, a sampling with four samples per modulation period is depicted. Each sample is an integration of the electrical signal over a duration dt that is a predefined fraction of the modulation period. In order to increase the signal to noise ratio of each sample the photo-generated charges are accumulated over several modulation periods, in some embodiments.

By activating the conduction channels of the demodulation region alternately the photogenerated charge injected into the demodulation region and spread out below the complete gate structure, is forced to drift or diffuse to the specific storage site. The alternation of the channel activation is done synchronously with the sampling frequency.

The electronic timing circuit, employing for example a field programmable gate array (FPGA), generates the signals for the synchronous channel activation in the demodulation stage. During the activation of one conduction channel, injected charge carriers are moved to the corresponding integration region. As example, only two conduction channels are implemented in the demodulation region. Assuming there is no background light BG (i.e., A=BG), then two samples A0 and A1 of the modulation signal sampled at times that differ by half of the modulation period, allow the calculation of the phase P and the amplitude A of a sinusoidal intensity modulated current injected into the sampling stage. The equations look as follows:

$$A=(A0+A1)/2$$

$$P=\text{arcsin}\,[(A0-A1)/(A0+A1)].$$

Extending the example to four conduction channels and sample values requires in practice a different gate structure of the demodulation region with four contacts and four integration regions and an appropriate clocking scheme for the electrode voltages in order to obtain four sample values A0, A1, A2 and A3 of the injected current. Generally the samples are the result of the integration of injected charge carriers over many quarters of the modulation period, whereby finally each sample corresponds to a multiple of one quarter of the modulation period. The phase shift between two subsequent samples is 90 degree.

Instead of implementing the four channels, one can also use two channels only, but adding a second measurement with the light source delayed by 90 degrees in order to get again the four samples.

Using these four samples, the three decisive modulation parameters amplitude A, offset B and phase shift P of the modulation signal can be extracted by the equations $$A=\text{sqrt}\,[(A3-A1)^2+(A2-A1)^2]/2$$

$$B=[A0+A1+A2+A3]/4$$

$$P=\text{arctan}\,[(A3-A1)/(A0-A2)]$$

The present invention is employed in these 3D measurement camera systems 10. It is termed adaptive neighborhood filter (ANF) and is used by the image processor IP to reduce the noise in distance by doing plausibility checks of the distance measurement or phase that is calculated for neighboring pixels of the two dimensional image sensor SN.

Figure 3:
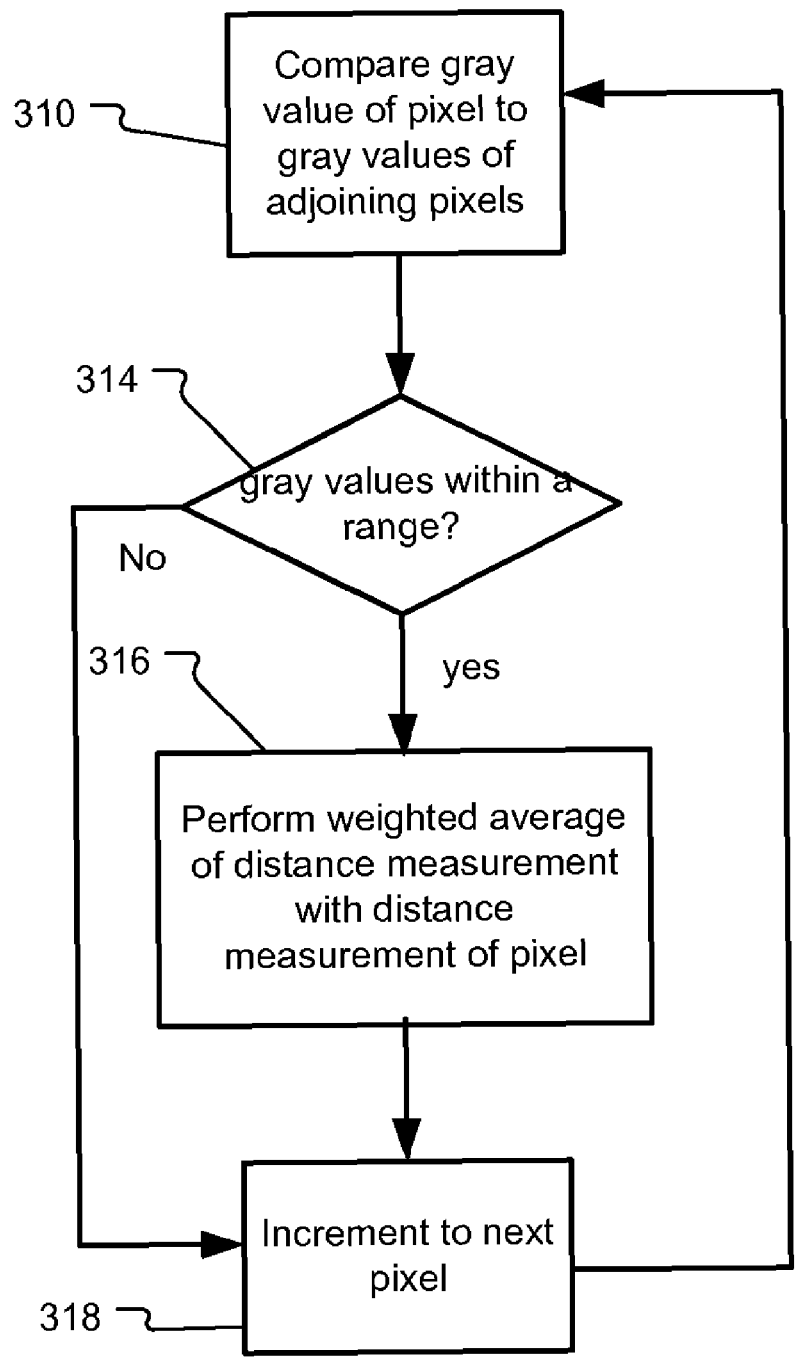
FIG. 3 is flow diagram illustrating a process for adaptive neighborhood filtering according to an implementation of the invention.

FIG. 3 illustrates a first embodiment of the ANF in which the image processor IP steps through the responses of the demodulation pixels DP of the image sensor SN. If the neighboring pixels have similar amplitude or gray values, the probability that the pixels are in the same plane is deemed high. Hence, such pixels are spatially averaged in distance information with higher weight.

In more detail, the image processor compares the gray or amplitude value of a pixel to the gray or amplitude values of adjoining and/or adjacent pixels, in step 310. The pixels are characterized by a two dimensional array of n by m pixels in the image sensor. In one example, the processing begins with pixel $(x_0,y_0)$ and ends with pixel $(x_n,y_m)$.

It determines whether any of the gray values of the adjacent pixels are within a range around the gray value of the current pixel in step 314. In one example the gray value of pixel $(x_a,y_b)$ is compared to the gray values of pixels $(x_{a+1},y_b)$, $(x_{a-1},y_b)$, $(x_a,y_{b+1})$, and $(x_a,y_{b-1})$. The distance information for pixel $(x_a,y_b)$ is averaged with the adjacent pixels that are within the range in step 316. For example, if the accepted range is r, the distance information for pixel $(x_a,y_b)$ is averaged with $(x_{a+1},y_b)$, for example, if (absolute value [Gray value $\{(x_a,y_b)\}$–Gray value $\{(x_{a-1}, y_b)\}$])<r. Usually the average is weighted average.

Then, in step 318, the current pixel is incremented through each pixel in the row and then when the end of a row is reached to successive columns and the process repeats until the end of the array is reached at pixel pixel $(x_n,y_m)$.

Figure 4:
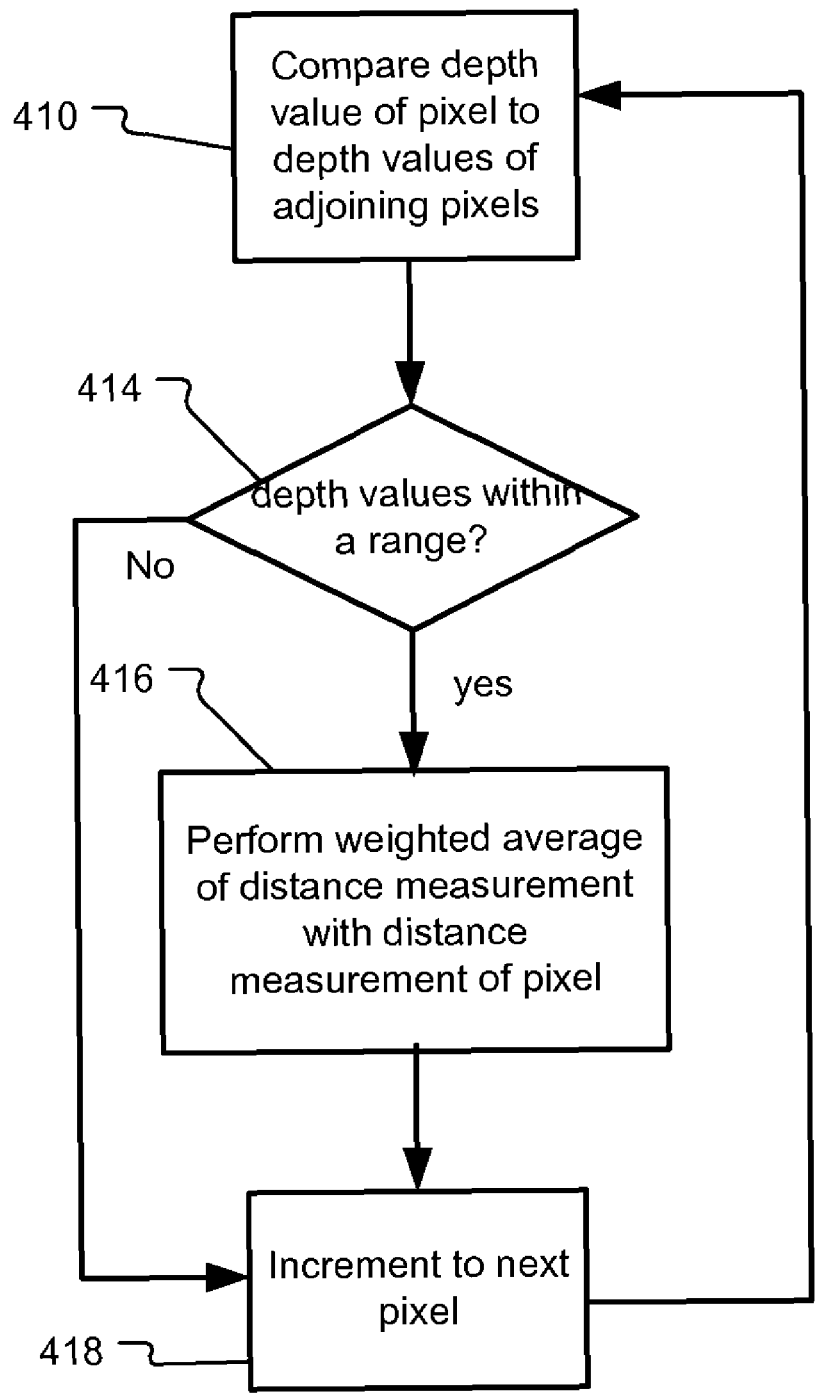
FIG. 4 is flow diagram illustrating another process for adaptive neighborhood filtering according to another implementation of the invention.

FIG. 4 illustrates a second embodiment of the ANF in which the image processor IP steps through the responses of the demodulation pixels DP of the image sensor SN. If the neighboring pixels have similar distance values, the probability that the pixels are in the same plane is rather high. Hence, such pixels are spatially averaged with higher weight.

In more detail, the image processor compares the distance value of a pixel to the distance values of adjoining and/or adjacent pixels, in step 410. In one example the distance value of pixel $(x_a,y_b)$ is compared to the distance values of pixels $(x_{a+1},y_b)$, $(x_{a-1},y_b)$, $(x_a,y_{b+1})$, and $(x_a,y_{b-1})$.

It determines whether any of the distance values of the adjacent pixels are within a range around the depth value of the current pixel in step 414. The distance information is averaged with the adjacent pixels that are within the range in step 416. Usually the average is weighted average here also. The range is selected in response to the gray value of the pixel in one example.

By checking these two scenarios, and doing weighted averaging, each pixel is adaptively filtered based on its neighbors.

If the distance range allowed is defined as a dependence on the gray level it can be considered as whether a plausibility check is performed before averaging. Whether an average should be made strongly depends on the depth noise level, which is given by the gray level (amplitude) information. For example, if the pixel to be filtered $(x_a,y_b)$ (reference pixel) shows 1 meter range or depth with a standard deviation of 5 millimeters, and its neighboring pixel $(x_i,y_j)$) a distance of 1.1 meters then filtering is not desired (see FIG. 5A).

On the other hand, pixel $(x_a,y_b)$ indicates 1meter depth but with a standard deviation of 20 centimeters, then it makes sense to filter it with its neighboring filter $(x_i,y_j)$being at 1.1 meters (FIG. 5B).

For the above mentioned reasons, not only the distance difference between neighboring pixels is taken into account but the weight is also affected by the pixel's amplitude.

Summarized, there are two weights determining how the neighboring pixel $(x_i,y_j)$ affects the pixel $(x_a,y_b)$ to be filtered (eq. 1 and eq. 2):

Weighting based on the range difference $\Delta z$ of the neighboring pixels and amplitude A (gray level):

$$\text{weight} \propto \frac{\sigma_{x_a,y_b}}{\Delta z} \approx \frac{1}{A_{x_a,x_b}} \cdot \frac{1}{\Delta z} \text{ with } \Delta z = |z_{x_a,x_b} - z_{x_i,y_j}| \quad (1)$$

Weighting based on the amplitude difference $\Delta A$ of the neighboring pixels:

$$\text{weight} \propto \frac{1}{\Delta A} \text{ with } \Delta A = |A_{x_a,y_b} - A_{x_i,y_j}| \quad (2)$$

With these two ideas in mind, different functions following the aforementioned rules can be derived:

$$\text{weight} = \exp(-\Delta z \cdot A_{x_a,y_b} \cdot k_0) \cdot \exp(-\Delta A \cdot k_1) \quad (3)$$

$$\text{weight} = \frac{1}{1 + k_0 \cdot \Delta z \cdot A_{x_a,y_b}} \cdot \frac{1}{1 + k_1 \cdot \Delta A} \quad (4)$$

From a processing speed point of view, it might turn out that equations of a form as given in (4) are much faster than the one shown in (3). Another possible weighting function easier to embed in firmware is given in (5):

$$\text{weight} = 2^{(-\Delta z \cdot A_{x_a,y_b} \cdot k_0)} \cdot 2^{(-\Delta A \cdot k_1)} \quad (5)$$

Further simplification of (4) results in (6):

$$\text{weight} = \frac{1}{1 + k_0 \cdot \Delta z \cdot A_{x_a,y_b} + k_1 \cdot \Delta A} \quad (6)$$

Looking at equation (5), it is obvious that the filter is only as good as the two parameters $k_0$ and $k_1$ are.

Therefore, best fitting values for $k_0$ and $k_1$ is preferred. This can be e.g. empirically achieved.

Figure 6A:
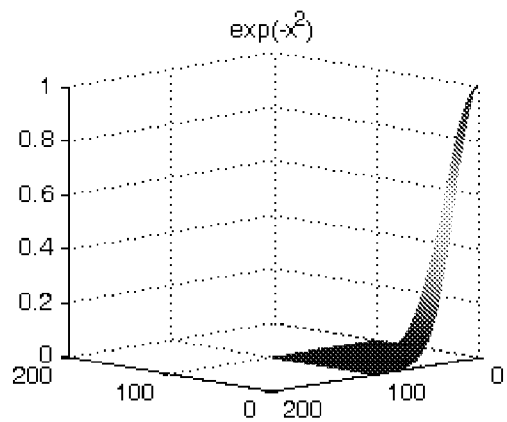
FIG. 6A-6F show different weighting functions for performing a weighted average of the distance information with respect to distance information of adjacent pixels.
Figure 6B:
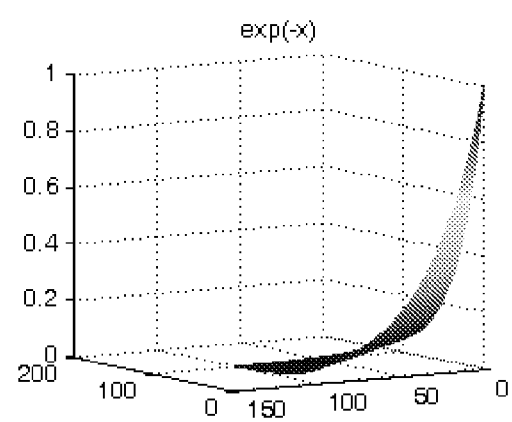
Figure 6C:
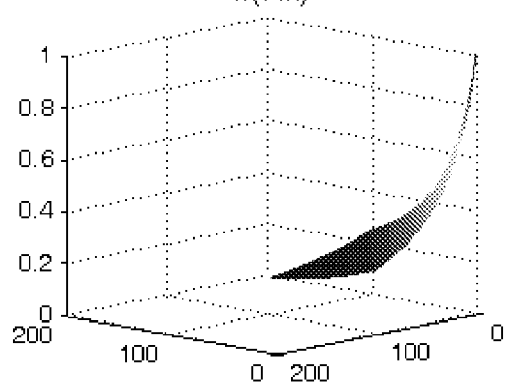
Figure 6D:
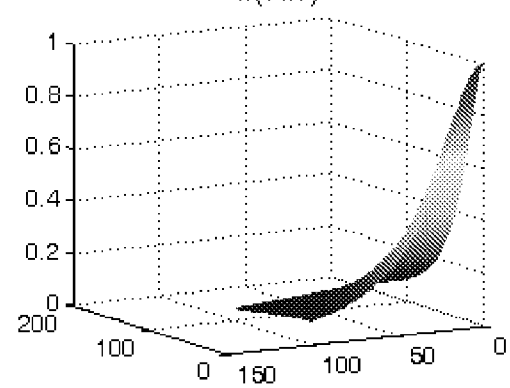
Figure 6E:
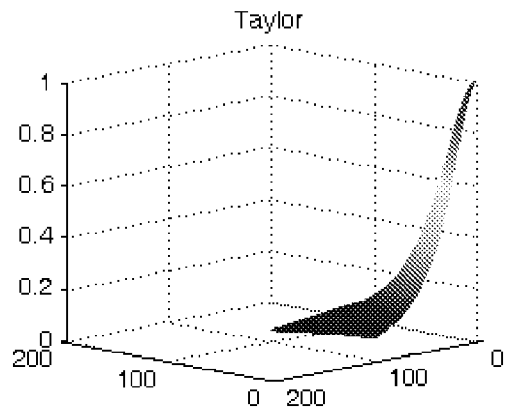
Figure 6F:
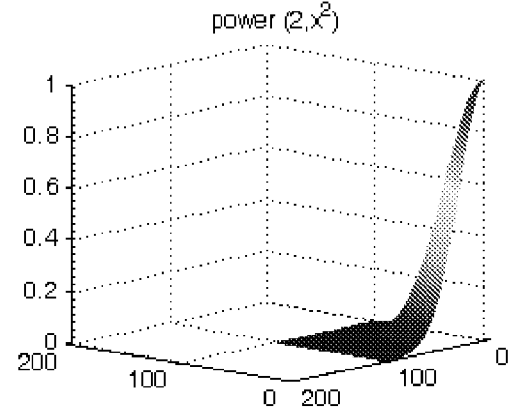

FIGS. 6A-6F different weighting functions for performing a weighted average of the distance information with respect to distance information of adjacent pixels. For clarity only one quadrant of the weighting function is illustrated. FIG. 6A shows $\exp(-x^2)$ function, FIG. 6B shows $\exp(-x)$ function, FIG. 6C shows $1/(1+x)$ function, FIG. 6D shows $1/(1+x^2)$, FIG. 6E shows Taylor function, and, FIG. 6F shows a power $(2, x^2)$ function, which are used in different embodiments to perform a weighted average of the current pixel distance with respect to the distance from adjacent pixels.

While this invention has been particularly shown and described with references to preferred embodiments thereof, it will be understood by those skilled in the art that various changes in form and details may be made therein without departing from the scope of the invention encompassed by the appended claims.

What is claimed is:
1. A method for filtering distance information from a 3D-measurement camera system, the method comprising:
    comparing amplitude and/or distance information for pixels to amplitude and/or distance information of adjacent pixels; and
    averaging distance information for the pixels with the distance information of the adjacent pixels when amplitude and/or distance information for the pixels is within a range of the amplitudes and/or distances for the adjacent pixels.

2. A method as claimed in claim 1, wherein the step of comparing comprises comparing the amplitude for pixels to adjacent pixels; and the step of averaging distance information for pixels comprises averaging the distance of pixels with the distance of adjacent pixels when the amplitude information for the pixels is within a range of the amplitudes for the adjacent pixels.

3. A method as claimed in claim 1, wherein the step of comparing comprises comparing the distance for pixels to the distance of the adjacent pixels; and the step of averaging distance information for pixels comprises averaging the distance of pixels with the distance of adjacent pixels when the distance information for the pixels is within a range of the distances for the adjacent pixels.

4. A method as claimed in claim 1, wherein the step of averaging is performed in response to a noise level of the distance measure for the pixels and/or noise levels of the distance for the adjacent pixels.

5. A 3D-measurement camera system, the comprising:
 a time of flight imaging sensor comprising a two dimensional array of pixels, each producing amplitude and distance information; and
 an image processor comparing amplitude and/or distance information for pixels to amplitude and/or distance information of adjacent pixels and averaging distance information for the pixels with the distance information of the adjacent pixels when amplitude and/or distance information for the pixels is within a range of the amplitudes and/or distances for the adjacent pixels.

6. A system as claimed in claim 5, wherein image processor compares the amplitude for pixels to adjacent pixels; and averages the distance of pixels with the distance of adjacent pixels when the amplitude information for the pixels is within a range of the amplitudes for the adjacent pixels.

7. A system as claimed in claim 5, wherein image processor compares the distance for pixels to the distance of the adjacent pixels; and averages the distance of pixels with the distance of adjacent pixels when the distance information for the pixels is within a range of the distances for the adjacent pixels.

8. A system as claimed in claim 5, wherein image processor compares averages in response to a noise level of the distance measure for the pixels and/or noise levels of the distance for the adjacent pixels.

9. A method for filtering distance information from a 3D-measurement camera system, the method comprising:
 comparing amplitude information for pixels to amplitude information of adjacent pixels; and
 averaging distance information for the pixels with the distance information of the adjacent pixels when the amplitude information for the pixels is within a range of the amplitudes for the adjacent pixels.

10. A 3D-measurement camera system, the comprising:
 a time of flight imaging sensor comprising a two dimensional array of pixels, each producing amplitude and distance information; and
 an image processor comparing amplitude information for pixels to amplitude information of adjacent pixels and averaging distance information for the pixels with the distance information of the adjacent pixels when amplitude information for the pixels is within a range of the amplitudes for the adjacent pixels.

* * * * *